Figure 6:
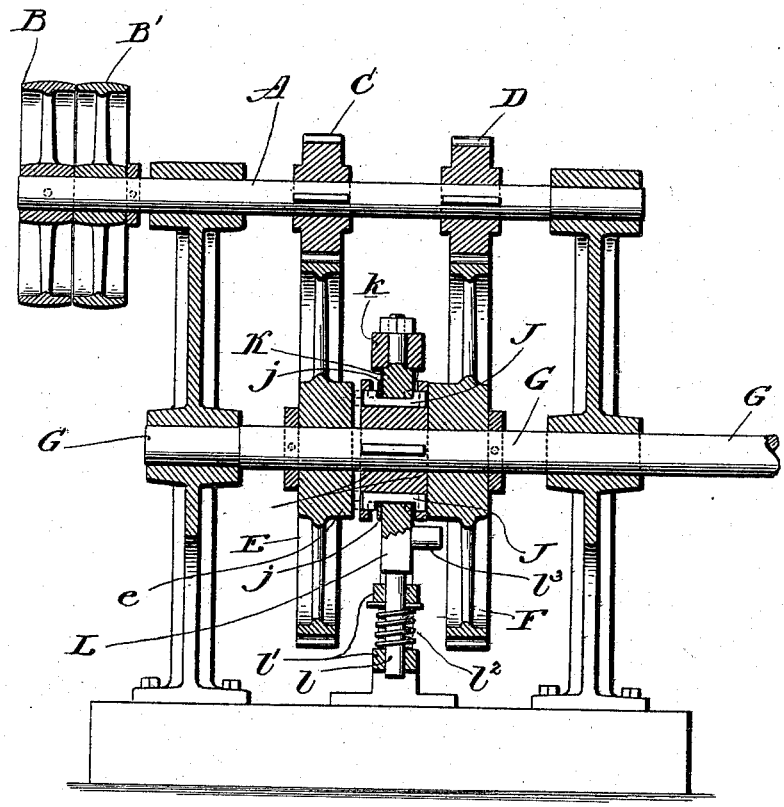

(No Model.) 2 Sheets—Sheet 1.
T. R. HOUSEMAN.
MECHANICAL MOVEMENT.
No. 534,796. Patented Feb. 26, 1895.
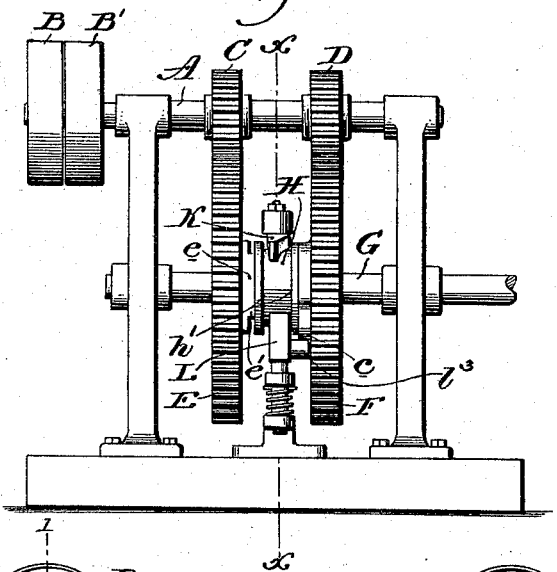
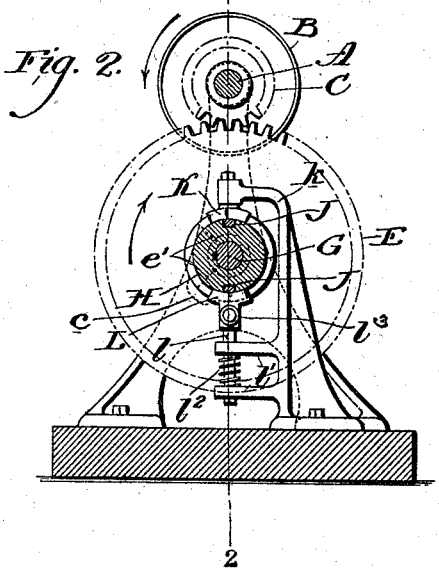
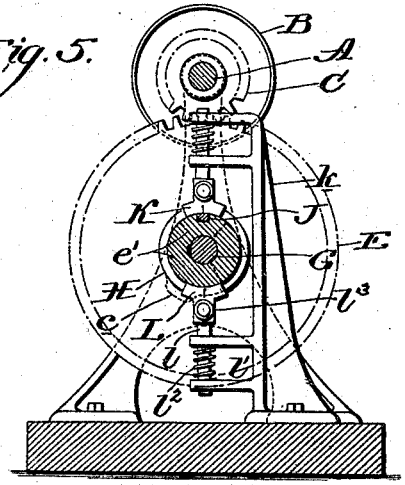
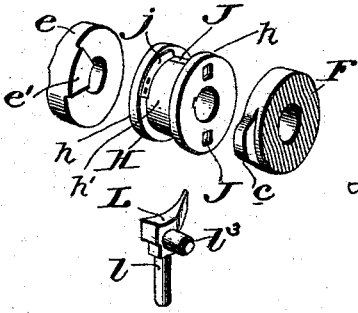
WITNESSES: INVENTOR:

(No Model.) 2 Sheets—Sheet 2.

T. R. HOUSEMAN.
MECHANICAL MOVEMENT.

No. 534,796. Patented Feb. 26, 1895.

WITNESSES: INVENTOR:

UNITED STATES PATENT OFFICE.

THOMAS R. HOUSEMAN, OF PHILADELPHIA, PENNSYLVANIA, ASSIGNOR TO R. GREENWOOD & BAULT AND SPROWLES & HOUSEMAN, OF SAME PLACE.

MECHANICAL MOVEMENT.

SPECIFICATION forming part of Letters Patent No. 534,796, dated February 26, 1895.

Application filed July 10, 1894. Serial No. 517,072. (No model.)

*To all whom it may concern:*

Be it known that I, THOMAS R. HOUSEMAN, a citizen of the United States, residing at Philadelphia, county of Philadelphia, and State of Pennsylvania, have invented a new and useful Improvement in Mechanical Movements, of which the following is a full, clear, and exact description, reference being had to the accompanying drawings, which form a part of this specification.

My invention has for its object to intermittently rotate a shaft by power applied to a continuously rotating shaft and to have the dwell of the intermittent shaft of different proportionate periods to its period of rotation of the intermittent shaft, and it consists in certain mechanism whereby that result is obtained, all of which will fully appear.

In the drawings: Figure 1 is a front elevation. Fig. 2 is an enlarged section on the line $x$—$x$, Fig. 1. Fig. 3 is a detached perspective view of the various parts of mechanism. Fig. 4 is a detached view of the spring pin. Fig. 5 is a view similar to Fig. 2 of a modified form. Fig. 6 is a section on line 1—2, Fig. 2.

A, is the main shaft driven by any desired means, as shown in the drawings. It is provided with a fast pulley B and a loose pulley B', and by means of a belt the fast pulley can be driven from a source of power, thus driving the shaft A.

C, D, are two gear wheels connected so as to revolve with shaft A, and which mesh respectively with gear wheels E and F loose upon the shaft G. Intermediate of these wheels, and secured to the shaft G is the clutch wheel H. This clutch wheel, shown in detail Fig. 3, has two flanges $h$, and an inset portion $h'$, between the flanges.

J, J, are spring pins, shown in detail, Fig. 4, which are adapted to enter orifices in the hub of wheel H; and a spring $j$ acts upon each pin to normally hold the pin beyond the outer surface of the wheel. When forced in, the ends of these pins lie flush with the outer surface of the wheel H.

Secured to the frame by the arm $k$ is a holding device which as shown is a cam K. This cam K is in alignment with the periphery of wheel H and the pins J. L, is a similar cam, also a holding device the difference being that cam K is fixed, while cam L is secured to rod $l$, which passes through orifices in the forked ends of the bracket $l'$, which bracket is secured to the frame. Between the forked end of the bracket $l'$, and surrounding the rod $l$, is the coil spring $l^2$. $l^3$ is a roller projecting from the cam L. These cams K and L are set at opposite sides of the periphery of the wheel H. The cams K and L strike the projections $j'$ on the pins J J when the wheel revolves, and force them into the body of the wheel.

Upon the gear wheel F is a releasing device which as shown is cam $c$, and the roller $l^3$ projects into the path of movement of the cam $c$, when the wheel F is revolved. The wheel E is provided with a hub $e$, having a catch device which as shown is a projection $e'$, which projects so as to strike the pins J, when they are released from their orifices and project beyond the wheel H. The wheels E and F are the same size and are driven by the wheels C—D, also the same size as each other, so the wheels E and F revolve together at the same speed loosely upon the shaft G. The cam $c$ and projection $e'$ are placed on their respective wheels so that the projection $e'$ leads or is in advance of the cam $c$ a distance about equal to the width of the projection.

The operation is as follows:—the wheel H being in the position shown in Fig. 2, both pins J, J, being held in, one by cam K, the other by cam L, and the shaft A driven, which causes the wheels E and F to revolve. When the cam $c$ reaches the roller $l^3$ it acts upon it depressing the cam L and releasing the pin J held in by said cam, and the spring $j$ drives said pin out, but the projection $e'$, being in the lead of the cam, has passed beyond the pin, and the pin strikes behind the raised portion $e'$, and the wheel E revolves without making connection between pin J and wheel E, but on the next revolution, the pin J, being still withdrawn, it is struck by the projection $e'$, connecting the pin J and wheel E, so that in the further revolution of wheel E the wheel H is carried with it, revolving the shaft G.

This continues for one half revolution, that is until the pin so acted on meets the cam K, which forces it into the orifice in wheel H, releasing connection between wheels E and H, and the wheel E continues to revolve without affecting the shaft G. The pin J which was held in by cam K, when the wheels F and H were first connected as above described, is released by the movement of wheel H, and remains out until it meets cam L, when it is driven in. This occurs at the same time the other pin J meets cam K, as above described. The wheels F and E revolve independent of the shaft, until the cam $c$ again strikes the roller $l^3$. It again releases pin J held by cam L. This is after a half revolution from the time the wheels F and H cease to revolve together, and the pin again strikes the behind projection $e'$ and the wheels E, F, revolve independently of wheel H a full turn after this release of the pin before projection $e'$ strikes pin J, and the wheels E and H again revolve together, as was described above, so that, this operation continuing, the wheels E and F continuously rotating, the wheel H and its shaft G will be moved (rotated) for one half of the revolution of the wheel F, and remain at rest for a revolution and one half of said wheel, so that the shaft will be given an intermittent rotary movement, in which the dwell will be a period three times the length of its rotation.

If it is desired that the duration of the dwell of shaft G, shall be twice instead of three times the period of its revolution, then I use the construction shown in Fig. 5, in which I use one pin J, and the cam K is similiar to cam L; that is, both are movable by cam C, similar to cam L of Fig. 2, and the cam $c$ leads the projection $e'$. In this case, supposing the pin to be held by the cam L, and the wheels E and F revolved, the cam $c$ being in advance of projection $e'$, it will release the pin so that it will be caught at once by the projection $e'$ and carried by it one half the revolution of wheel F, moving the wheel H and shaft G one half revolution, and the cam $c$ leading the projection $e'$ will have passed cam K before the pin reaches it, and the pin will go out of action at that point. The wheel E carrying cam $c$, then has to make a revolution before it releases the pin J, and hence the wheel F has to make a complete revolution before the projection $e'$ strikes the pin J so if the action be continued, the operation on wheel H and its shaft G is rotated for half revolution of wheel F at rest for complete revolution of wheel F, rotated for half of revolution, at rest for complete revolution, &c. Thus the dwell of the shaft is for a period twice as long as its rotation.

When it is desired to have the period of the rest of shaft G equal the period of its rotation, then I use the construction of Figs. 2 and 3, except that I have the cam $c$ lead or be in advance of the projection $e'$. With this arrangement the cam $c$ releases the pin held by cam L, which is immediately caught by projection $e'$, and the wheels H and F revolve together until the pin reaches the cam K, when it is thrown out of action. The pin J initially held by the cam K, is at that time thrown out of action by the cam L, the wheel F revolves free from wheel H, until the cam $c$ again releases the pin held by the cam L and it is caught by projection $e'$, which is after one half revolution of wheel F, so that by this arrangement wheels F and H revolve together for one half the revolution of wheel F, and together for a half revolution of wheel F, so that the period of rotation and the dwell of wheel H and its shaft G in this operation are equal.

Having now fully described my invention, what I claim, and desire to protect by Letters Patent, is—

1. The combination with two gear wheels, and means to rotate said wheels, of a shaft, two gear wheels loose upon said shaft, the first set of gears meshing with the last mentioned wheels in pairs, a catch device carried by one of said gear wheels upon the shaft, a clutch device secured to said shaft intermediate the gears upon said shaft, two pins in said clutch device adapted when free to lie in the path of said catch device, holding devices adapted normally to retain said pins out of alignment with the catch device and to force said pins out of alignment when struck by said pins, said devices being set adjacent to opposite points of the clutch device, and a releasing device carried by the other gear wheel upon the shaft.

2. The combination with two gear wheels, and means to rotate said wheels, of a shaft, two gear wheels loose upon said shaft, the first set of gears meshing with the last mentioned wheels in pairs, a catch device carried by one of said gear wheels upon the shaft, a clutch device secured to said shaft intermediate the gears upon said shaft, two pins in said clutch device, adapted when free to lie in the path of said catch device, holding devices adapted normally to retain said pins out of alignment with the catch device and to force said pins out of alignment, when struck by said pins, said devices being set adjacent to opposite points of the clutch device, one of said holding devices being movable, a releasing device carried by the other gear wheel upon the shaft, the movable holding device being in the path of movement of the releasing device and adapted when struck by it to release the pin.

3. The combination with two gear wheels, and means to rotate said wheels, of a shaft, two gear wheels loose upon said shaft, the first set of gears meshing with the last mentioned wheels in pairs, a catch device carried by one of said gear wheels upon the shaft, a clutch device secured to said shaft intermediate the gears upon said shaft, two pins in said clutch device adapted when free to lie in the path of said catch device, holding devices adapted normally to retain said pins out of alignment with the catch device, and to return said pins out of alignment when struck by said pins, said devices being set adjacent to opposite points of the clutch device, one of said holding devices being movable, a releasing device carried by the other gear wheel upon the shaft, the movable holding device being in the path of movement of the releasing device and adapted when struck by it to release the pin, the catch device being set upon its wheel in advance of the releasing device upon its wheel.

4. The combination with two gear wheels, and means to rotate said wheels, of a shaft, two gear wheels loose upon said shaft, the first set of gears meshing with the last mentioned gears in pairs, a catch device carried by one of said gear wheels upon the shaft, a clutch device secured to said shaft intermediate the gears upon said shaft, a pin in said clutch device adapted when free to lie in the path of said catch device, holding devices adapted normally to retain said pin out of alignment with the catch device, and to return said pin out of alignment when struck by said pin, said devices being set adjacent to opposite points of the clutch device, and a releasing device carried by the other gear wheel upon the shaft.

5. In combination with a shaft, two wheels loose upon said shaft, means to revolve said wheels uniformly, a catch device carried by one of said wheels, a clutch device secured to said shaft intermediate said wheels, two pins in said clutch device adapted when free to lie in the path of said catch device, holding devices adapted normally to retain said pins out of alignment with the catch device and to force said pins out of alignment when struck by said pins, said devices being set adjacent to opposite points of the clutch device, and a releasing device carried by the other wheel upon the shaft.

6. In combination with a shaft, two wheels loose upon said shaft, means to revolve said wheels uniformly, a catch device carried by one of said wheels, a clutch device secured to said shaft intermediate said wheels, two pins in said clutch device adapted when free to lie in the path of said catch device, holding devices adapted normally to retain said pins out of alignment with the catch device and to force said pins out of alignment when struck by said pins, said devices being set adjacent to opposite points of the clutch device, one of said holding devices being movable, a releasing device carried by the other wheel upon the shaft, the movable holding device being in the path of movement of the releasing device and adapted when struck by it to release the pin.

7. In combination with a shaft, two wheels loose upon said shaft, means to revolve said wheels uniformly, a catch device carried by one of said wheels, a clutch device secured to said shaft intermediate said wheels, two pins in said clutch device adapted when free to lie in the path of said catch device, holding devices adapted normally to retain said pins out of alignment with the catch device, and to force said pins out of alignment when struck by said pins, said devices being set adjacent to opposite points of the clutch device, one of said devices being movable, a releasing device carried by the other wheel upon the shaft, the movable holding device being in the path of movement of the releasing device and adapted when struck by it to release the pin, the catch device being set upon its wheel in advance of the releasing device upon its wheel.

8. In combination with a shaft, two wheels loose upon said shaft, means to revolve said wheels uniformly, a catch device, carried by one of said wheels, a clutch device secured to said shaft intermediate to said wheels, a pin in said clutch device adapted when free to lie in the path of said catch device, holding devices adapted normally to retain said pin out of alignment with the catch device and to force said pin out of alignment when struck by said pin, said devices being set adjacent to opposite points of the clutch device, a releasing device carried by the other wheel upon the shaft.

In testimony of which invention I have hereunto set my hand.

THOMAS R. HOUSEMAN.

Witnesses:
M. FRANCES ELLIS,
PHILIP BONTELJE.